US006938218B1

(12) United States Patent
Rosen

(10) Patent No.: US 6,938,218 B1
(45) Date of Patent: Aug. 30, 2005

(54) METHOD AND APPARATUS FOR THREE DIMENSIONAL INTERNET AND COMPUTER FILE INTERFACE

(75) Inventor: Mike Rosen, West Chester, PA (US)

(73) Assignee: James Nolen, King of Prussia, PA (US)

( * ) Notice: Subject to any disclaimer, the term of this patent is extended or adjusted under 35 U.S.C. 154(b) by 0 days.

(21) Appl. No.: 09/561,862

(22) Filed: Apr. 28, 2000

(51) Int. Cl.$^7$ ................................................ G06F 3/00
(52) U.S. Cl. ...................... 715/850; 715/848; 715/854; 715/782; 345/419
(58) Field of Search ................................ 715/700, 744, 715/764–765, 781–782, 835–836, 839, 848–855, 419, 427, 428, 501.1, 513, 526; 345/419, 427, 428, 700, 744, 764, 765, 781, 782, 835, 836, 839, 848–855; 707/1, 100

(56) References Cited

U.S. PATENT DOCUMENTS

| | | | |
|---|---|---|---|
| 5,303,388 A | 4/1994 | Kreitman et al. ........... 345/836 |
| 5,515,486 A | 5/1996 | Amro et al. ................. 345/848 |
| 5,670,984 A | 9/1997 | Robertson et al. .......... 345/585 |
| 5,671,381 A | 9/1997 | Strasnick et al. ........... 345/848 |
| 5,678,015 A | * 10/1997 | Goh ........................... 345/782 |
| 5,689,287 A | 11/1997 | Mackinlay et al. ......... 345/427 |

(Continued)

OTHER PUBLICATIONS

Card et al, Readings in Information Visualization– Using Vision to Think, "The WebBook and the Web Forager: An Information Workspace for the World–Wide Web", Academic Press, 1999, pp. 544–550.*

Card et al, Readings in Information Visualization– Using Vision to Think, "The Document Lens", Academic Press, 1999, pp. 562–569.*

"Information Visualization Using 3D Interactive Animation", George C. Robertson et al., Communications of the ACM, Apr. 1993, vol. 36, No. 4, pp. 57–71.

"Rooms: The Use of Multiple Virtual Workspaces to Reduce Space Contention in a Window–Based Graphical User Interface", D. Austin Henderson, Jr. et al., ACM Transactions on Graphics, vol. 5, No. 3, Jul. 1986, pp. 211–243.

"The Perspective Wall: and Context Smoothly Integrated", Jock D. Mackinlay, et al., Association for Computing Machinery, 1991, pp. 173–179.

"The Information Visualizer, and Information Workspace", Sutart K. Card et al., Association For Computing Machinery, 1991, pp. 181–188.

"Cone Trees: Animated 3D Visualizations of Hierarchical Information", George G. Robertson et al., Association for Computing Machinery, 1991, pp. 189–194.

International Search Report for PCT/US01/13768, dated Aug. 2, 2001.

*Primary Examiner*—Sy D. Luu
(74) *Attorney, Agent, or Firm*—Synnestvedt & Lechner LLP

(57) ABSTRACT

A method and apparatus for geometrically organizing, interfacing to, surfing, authoring, converting and viewing computer files such as pages on the World Wide Web or operator interface windows of application software. A plurality of related Web pages or windows are organized and presented for view on a computer display in an apparent three or four dimensional relationship to each other with a front, right, left, top, and bottom face (page). A back face may be accessed by a button. Each face and its corresponding page/file can be further spatially related to five other faces and their corresponding pages/files in the same manner ad infinitum. The related pages are organized as a matrix of three dimensional cubes or four dimensional hypercubes.

51 Claims, 9 Drawing Sheets

U.S. PATENT DOCUMENTS

| | | | |
|---|---|---|---|
| 5,724,492 A | 3/1998 | Matthews, III et al. | 345/419 |
| 5,767,854 A | 6/1998 | Anwar | 345/848 |
| 5,786,820 A | 7/1998 | Robertson | 345/853 |
| 5,790,713 A | 8/1998 | Kamada et al. | 382/285 |
| 5,801,704 A | 9/1998 | Oohara et al. | 345/856 |
| 5,847,709 A * | 12/1998 | Card et al. | 345/850 |
| 5,880,733 A | 3/1999 | Horvitz et al. | |
| 5,898,435 A | 4/1999 | Nagahara et al. | 345/841 |
| 6,005,578 A | 12/1999 | Cole | 345/854 |
| 6,016,145 A | 1/2000 | Horvitz et al. | |
| 6,023,275 A | 2/2000 | Horvitz et al. | |
| 6,028,600 A | 2/2000 | Rosin et al. | 345/718 |
| 6,035,330 A | 3/2000 | Astiz et al. | 709/218 |
| 6,043,818 A | 3/2000 | Nakano et al. | 345/355 |
| 6,166,738 A * | 12/2000 | Robertson et al. | 345/839 |
| 6,188,405 B1 | 2/2001 | Czerwinski et al. | 345/339 |
| 6,230,116 B1 | 5/2001 | Ronen et al. | |
| 6,240,421 B1 * | 5/2001 | Stolarz | 707/102 |
| 6,297,824 B1 | 10/2001 | Hearst et al. | 345/357 |
| 6,313,855 B1 * | 11/2001 | Shuping et al. | 345/854 |
| D458,611 S * | 6/2002 | Gallo | D14/485 |
| 6,486,895 B1 | 11/2002 | Robertson et al. | 345/776 |
| 6,577,330 B1 | 6/2003 | Tsuda et al. | 345/782 |
| 6,597,358 B2 * | 7/2003 | Miller | 345/427 |
| 6,621,509 B1 * | 9/2003 | Eiref et al. | 345/836 |
| 6,628,313 B1 * | 9/2003 | Minakuchi et al. | 345/853 |
| 6,636,246 B1 * | 10/2003 | Gallo et al. | 345/805 |
| 6,710,788 B1 * | 3/2004 | Freach et al. | 345/778 |
| 2002/0135538 A1 * | 9/2002 | Rosen | 345/1.1 |

* cited by examiner

METHOD AND APPARATUS FOR THREE DIMENSIONAL INTERNET AND COMPUTER FILE INTERFACE

FIELD OF THE INVENTION

The invention pertains to the presentation of data on a computer display. More particularly, the invention pertains to a method and apparatus that can be used for geometrically organizing, interfacing to, surfing, authoring, and viewing pages on the World Wide Web.

BACKGROUND OF THE INVENTION

By now, almost everyone is familiar with the Internet and the World Wide Web (Web). The Internet is a collection of interconnected communication networks that together pan the globe. Information content on the Internet is presented via pages, each page comprising a file that is stored on a computer server that is coupled to the Internet and assigned a Uniform Resource Locator (URL), which is essentially an address on the Internet. These pages are accessible to anyone with access to a computer coupled to the Internet and who knows (or at least can determine, for instance, via search engine) the URL of the particular page of interest. Most pages on the Web are, not only directly accessible, but also accessible via other pages on the Internet through a protocol termed hypertext transfer protocol (HTTP). Hypertext Markup Language (HTML) is the computer language generally used to describe how pages are organized, formatted, and linked together via the Internet.

Specifically, pages on the Web are interconnected via hyperlinks. A hyperlink is a portion of text or an image in one Web page that automatically addresses another page on the Web. By manipulating one's mouse to cause the screen pointer to move over the hyperlink and clicking, the page associated with that hyperlink is accessed via the Internet and is made to replace the previous page on one's computer screen.

Web browsers are computer programs that enable one to access and view Web pages via direct addressing (typing the address of a Web page in an address field) and/or by hyperlinking as described above. Netscape Navigator and Microsoft Explorer are the two most common Web browser software packages in use today. These Web browsers generally load and display a single page on the computer screen at any given time. When a Web browser links to that page, the browser software loads and displays that page. The browser may maintain a copy of the previous page(s) in memory for quick retrieval and display should the operator wish to return to that page, as is very common when surfing the Web.

The organization of Web pages relative to each other in accordance with hyperlinks in the HTTP protocol may be characterized as linear or tree-like. Of course, one may directly access any page on the Web simply by typing in its URL in the appropriate field of a Web browser. However, accessing Web pages through the use of hyperlinks, which, in practice, is the way most Web pages are accessed, is through a tree-like organization such as illustrated in FIG. 1. That is, a first Web page 12a contains a plurality of hyperlinks, 14a, 14b, 14c, to other Web pages. In FIG. 1, each hyperlink is shown as a connecting line 14a, 14b, 14c, et seq. between the page containing the hyperlink (originating page) and the page to which it links (the destination page) with the arrowhead pointing to the page to which the hyperlink connects (i.e., the arrowhead points away from the page containing the hyperlink). Two pages may cross-hyperlink to each other such as illustrated by connecting lines 14a, 14e, 14f, and 14i with double arrows.

Because of the tree-like organization, one must perform several hyperlinks to get from one page to a second page that is not directly coupled to the first page by a hyperlink in the first page. For instance, if one wishes to navigate from page 12a to page 12l using hyperlinks, one must hyperlink from page 12a to page 12b, then from page 12b to page 12f and then from page 12f to page 12l.

This tree-like organization can be a severe nuisance when someone knows to what page he or she wishes to link but must go through several hyperlink to arrive there. Let us consider a very common example in the field of e-commerce in which this problem may manifest itself. Suppose an individual is browsing the e-commerce Web site of a general retailer such as an on-line department store. The individual wishes to buy a pair of jeans, but does not know the URL of the exact page on which the jeans he or she wishes to purchase appear, but only the URL of the main page, of the retailer, e.g., departmentstore.com/jindex.htm (most Web browsers will also recognize departmentstore.com alone as this URL). The individual would type in "HTTP://" followed by "www.departmentstore.com/" in the address field. The main page of an e-tailer would typically include a general welcome message, general information about the retailer and a plurality of hyperlinks to other pages maintained by the retailer. In order to arrive at the page that will allow the individual to order a pair of jeans, he or she may need to hyperlink through several layers of increasingly more specialized pages, such as Main→Clothing→Men→Pants→Casual→Jeans→Brand Name.

In this example, the individual had to go through six hyperlinks to get from the main page to view the page that would allow him or her to buy the jeans. For each hyperlink, the browser software must load the linked-to page, which can be time consuming.

Accordingly, it is an object of the present invention to provide an improved method and apparatus for organizing, interfacing to, surfing, authoring, and viewing pages on the World Wide Web.

It is another object of the present invention to provide a method and apparatus for geometrically organizing, interfacing to, surfing, authoring, and viewing pages on the World Wide Web.

It is another object of the present invention to provide a method and apparatus for geometrically organizing, interfacing to, surfing, authoring, and viewing displayable computer files.

It is a further object of the present invention to provide a method and apparatus for geometrically organizing, interfacing to, surfing, authoring, and viewing pages on the World Wide Web via an interface that is a two dimensional representation of a higher dimensional space in a manner that is intuitive.

It is yet one more object of the present invention to provide a method and apparatus for three dimensionally organizing, interfacing to, surfing, authoring, and viewing pages on the World Wide Web.

It is yet one more object of the present invention to provide a method and apparatus for four dimensionally organizing, interfacing to, surfing, authoring, and viewing pages on the World Wide Web.

SUMMARY OF THE INVENTION

The invention is a method and apparatus for spatially organizing, interfacing to, surfing, authoring, converting and/or viewing computer files, and particularly pages on the World Wide Web. A plurality of related Web pages are organized and presented for view on a computer screen in an apparent three or four dimensional relationship to each other. In a basic embodiment, five pages are displayed comprising front, right, left, top, and bottom faces (pages) forming five faces of a cube. A sixth page, the back page, is not seen on the screen, but which is logically and organizationally behind the computer operator, may also be accessed by a BACK button or the like. In other embodiments, more pages can be displayed by adding to the display the faces of additional cubes surrounding the first cube. For organizational purposes, the cubes forming the overall display can be considered adjacent cubes to correspond to a three dimensional space. Alternately, they can be considered sides of adjacent four dimensional hypercubes and stored in memory along with data relating the pages to each other using this four dimensional organization.

For instance, in another embodiment, 25 pages can be displayed simultaneously by arranging 20 more pages around the aforementioned first five pages, with these pages arranged as one side (comprising 5 faces or pages) of four more cubes or hypercubes surrounding the primary hypercube. The next level would be 125 pages displayed simultaneously by surrounding each of the four secondary cubes or sides of hypercubes with four more cubes each (or sides of four more hypercubes) surrounding it.

The three or four dimensional spatial organization of pages can be representative of a true three dimensional spatial relationship of pages to each other. For instance, where the pages are renderings (e.g., photographs) of actual or fictitious three dimensional space, they can be arranged within the framework of the cube or hypercube faces in the relationship that they have to each other in actual space. However, the invention is equally applicable to Web pages that do not actually represent physical spaces. In such cases, the arrangement of linked Web pages still can be organized and/or displayed in the same arrangement even though the spatial basis of the arrangement does not necessarily bear any relation to the organization of the information content on the pages to each other. While such pages can be filled into the display format in a random fashion, preferably, they are arranged in some logical organization relative to the spatial framework provided by the present invention.

Thus, in accordance with the invention, multiple displayable computer files or Web pages are displayed simultaneously. The pages are loaded in a generally outward-from-the-center direction so that an operator can begin viewing and interacting with a page while other pages continue to load. One navigates through the displayed pages by moving the screen pointer onto a particular one of the displayed pages. In response, the pages shift positions within the display framework so that the selected page moves to the center face of the display and all of the other pages move accordingly to maintain the same spatial relationship to each other. Thus, when a new page becomes the center page, (1) some of the pages previously displayed move to new windows, (2) some pages disappear from the display because their spatial relation to the other pages is such that the hypercube face to which they correspond is not a face that appears on the screen in accordance with the new orientation, and (3) some new pages appear because the hypercube face to which they correspond appears in the display in accordance with the new orientation, whereas they did not in the previous orientation. Depending on the number of non-displayed pages stored in memory, and the particular reorientation, the newly displayed pages may have already been in memory or may need to be loaded at the time of reorientation. Likewise, the pages that disappear from the display may be overwritten in memory or may remain.

The logical/spatial relationship of the windows in the display allow for navigation, not only through a virtual three dimensional (or at least three variable) space, but also in a fourth "direction". As would be the case for a real hypercube, navigating into certain faces of a hypercube side corresponds to moving in the fourth dimension. This fourth dimension can organizationally correspond to any fourth variable, including time within the context of the theories of special and general relativity. For instance, if three of the four dimensions correspond to the three spatial dimensions, the fourth dimension may correspond to moving further into a given hypercube space to a greater level of detail.

Particularly, each hypercube defines a space that can be represented in greater detail and accordingly can be considered to be comprised of a plurality of smaller hypercubes. In an embodiment where the faces display renderings of actual space (for example, rooms in a museum), navigating into a face corresponding to the fourth dimension might instead correspond to entering the room so that the faces in the display will now represent individual paintings in that room. Navigating again into a center face might logically lead to another set of even "smaller" hypercubes in which the displayed faces contain pages containing information about the painter or perhaps display other paintings by the same painter. Navigating into the faces corresponding to the other three spatial dimensions, on the other hand, corresponds to moving from room to room in the museum.

DETAILED DESCRIPTION OF THE INVENTION

The invention is a method and apparatus for displaying data on a computer display. While the description herein of particular embodiments of the invention relate to computer screens, the invention can also be implemented in connection with a heads-up display or other means for interfacing between a computer program or file and the operator. It is also a method and apparatus for organizing the data. The invention is particularly adapted to and suitable for organizing and displaying pages on the World Wide Web on a two dimensional computer screen or a 3-D heads up display. However, the invention is conceptually applicable to any group of computer files that have information that can be displayed on a computer display.

The method of organizing and displaying data files in accordance with the present invention is based on an analogy to a spatial organization of objects and, particularly a three or four dimensional spatial organization. In this specification, the term dimension refers to a spatial dimension, unless otherwise noted.

A hypercube is the four dimensional equivalent of a three dimensional cube, in the same manner that a cube is the three dimensional equivalent of a two dimensional square. A hypercube is a theoretical construct which, of course, cannot exist in the three dimensional space within which we live. Fortunately, it is not necessary to understand or visualize a hypercube to understand how data is displayed in accordance with the present invention. Accordingly, while it is useful to understand the basis for the method of display, the method of display itself is readily apparent simply from the drawings herein. Further, while some understanding of a hypercube and the theory of four dimensional space is useful in understanding the organization of pages of data in accordance with the present invention, it is not necessary.

Figure 1:
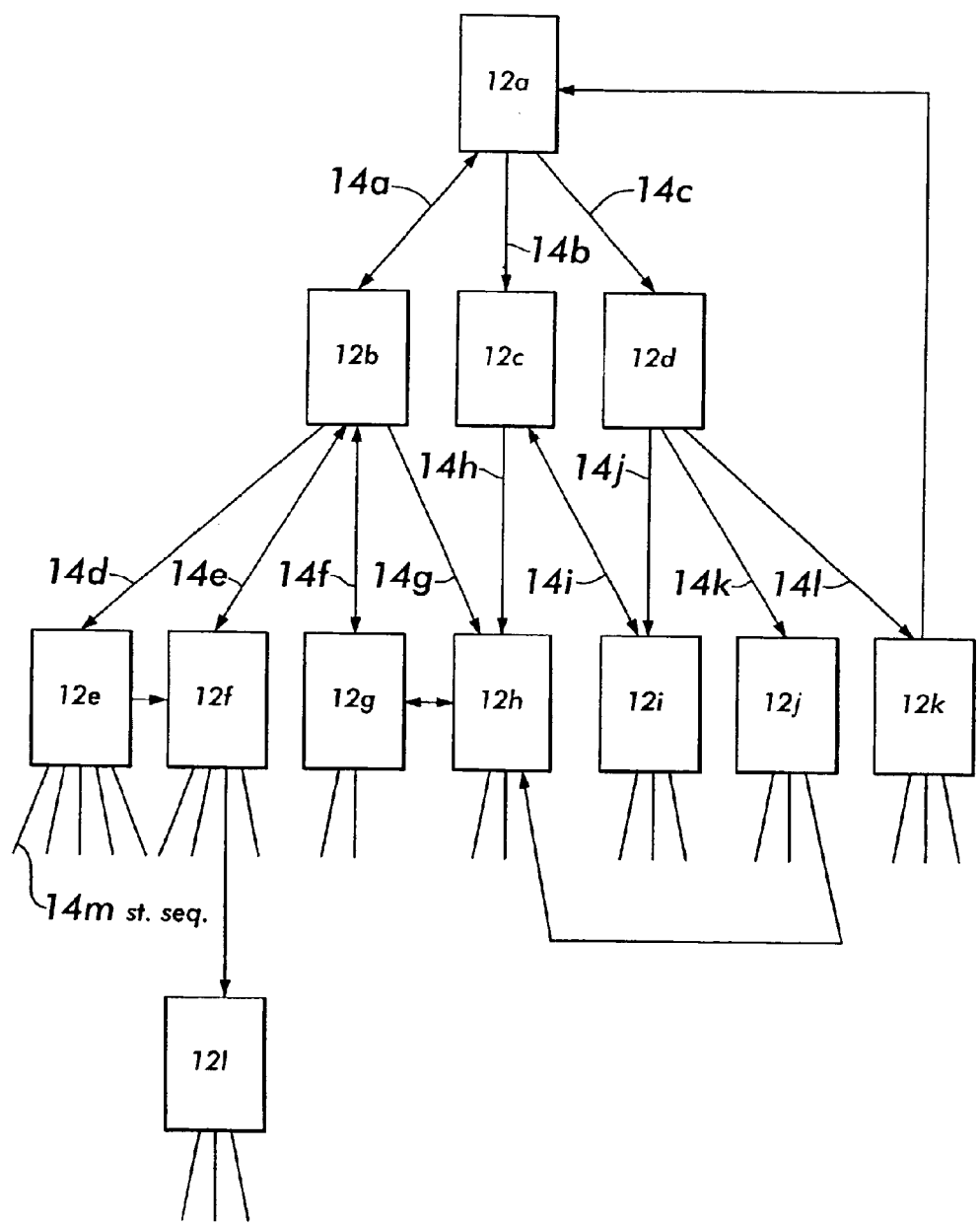
FIG. 1 is a diagram illustrating organization of pages on the world wide Web in accordance with the prior art.
Figure 2A:
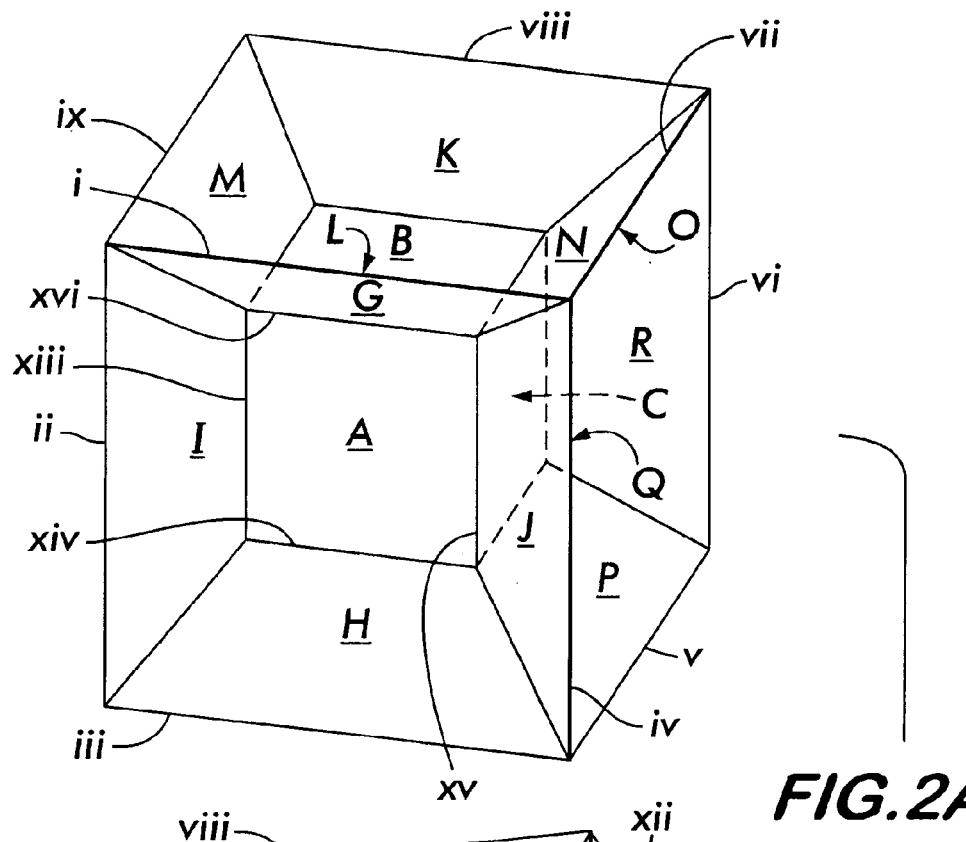
FIG. 2A is a perspective view of a hypercube.
Figure 2A:
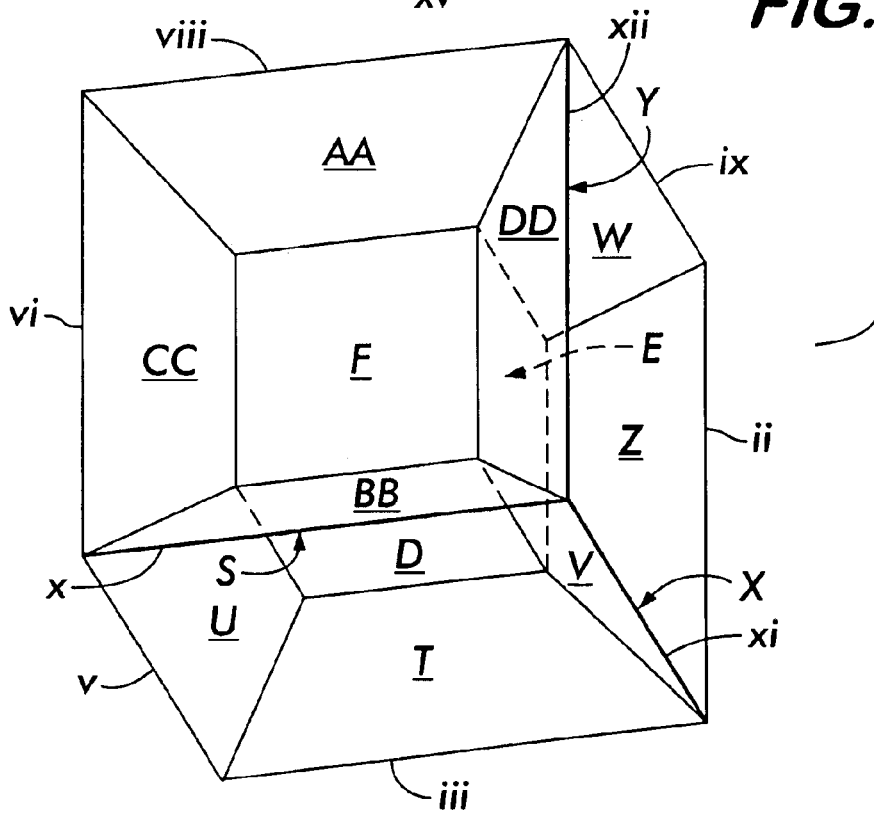
Figure 2B:
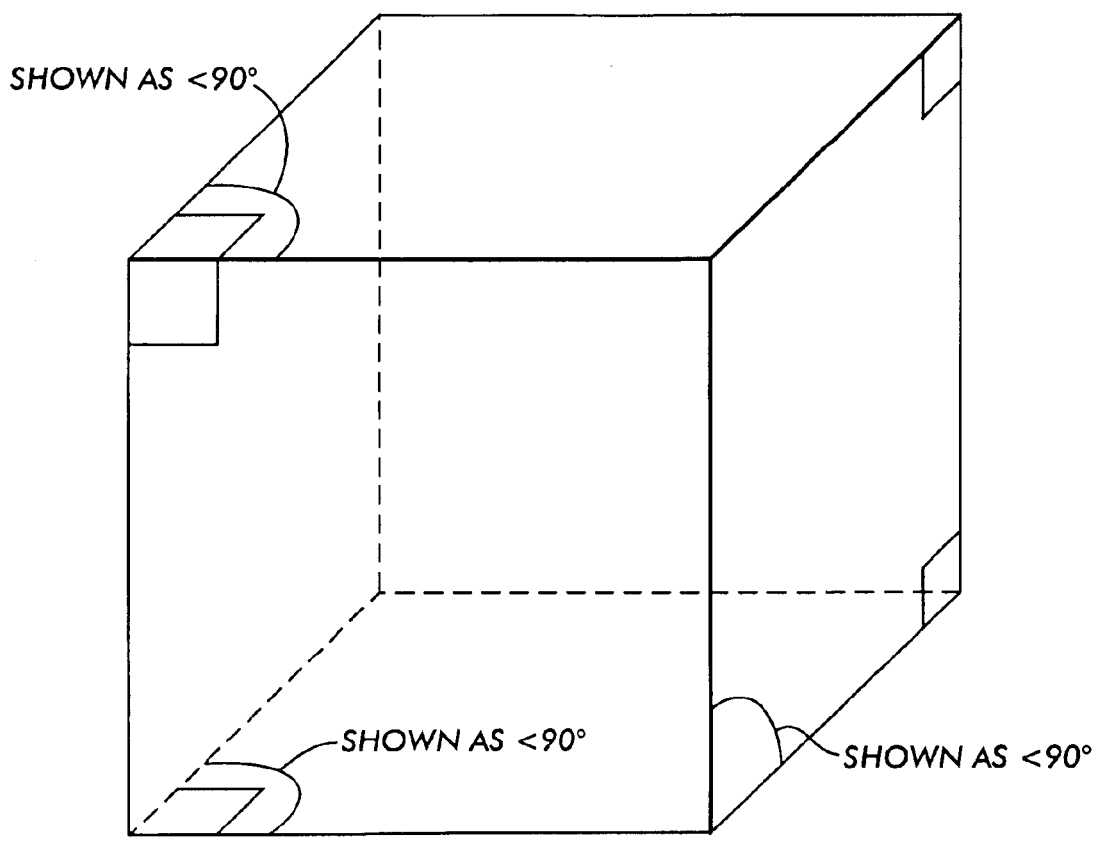
FIG. 2B is a perspective view of a cube.

FIG. 2A is a perspective view of a hypercube in accordance with the present invention. Thus, FIG. 2A is a two dimensional representation (a drawing) of a three dimensional representation of a four dimensional object. For purposes of comparison, FIG. 2B is a perspective view of a cube. Thus, FIG. 2B is a two dimensional representation (a drawing) of a three dimensional object.

All of the adjoining edges of a cube are perpendicular to each other even though, in the two dimensional representation of it (the drawing of FIG. 2B), some of the angles are drawn as acute angles. Thus, it can be seen from FIG. 2B, that when a three dimensional object is represented in two dimensions, some of the perpendicular angles are represented as acute angles to provide a sense of perspective since that is exactly how the true three-dimensional object appears to the eye. Thus, when viewing a three dimensional object, such as a cube, from a perspective view, rather than looking straight into one side (in which case one would see merely a square, i.e., one face of the cube), the angles between some of the adjoining edges do not appear to the eye to be perpendicular. However, one's brain intuitively interprets the image as a cube and knows that all of the adjoining edges meet perpendicularly to each other.

The same rules apply to a hypercube. That is, all of the adjoining edges of a hypercube are perpendicular to each other in four dimensional space (if it existed). When represented in three dimensions (or two dimensions, as in FIG. 2A), not all of the angles appear perpendicular even though they are perpendicular. Also, not all of the faces appear square, even though they are square.

As is well known, a cube comprises six faces. A hypercube may be considered a plurality of three dimensional cubes (specifically 6 cubes) that are spatially related to each other in the fourth spatial dimension. Thus, in FIG. 2A, faces A, B, C, D, E, and F in FIG. 2A define one of those six cubes. Each face of the cube is a two dimensional surface (a square) defined by four edges, such as edges xiii, xiv, xv, and xvi which define face A in FIG. 2A. As can be seen from FIG. 2A, for sake of simplicity, one may also consider a hypercube to comprise a cube with four additional faces extending perpendicularly from each of the six faces of the cube (one face for each edge of the face of the cube) and a fifth face connecting the outer edges of those four faces. The four faces extending perpendicularly from face A of the first cube, for example, are faces G, H, I, and J in FIG. 2A. The sixth face of each cube of the hypercube is not shown in FIG. 2A because showing them would obfuscate the nature of a hypercube. Specifically, there is a face joining the four outer edges of the four faces extending from each face of the cube. For instance, there is a face joining edges, i, ii, iii, and iv which is not shown in FIG. 2A. However, if these faces were shown in FIG. 2A, the nature of the hypercube would be concealed since these faces would occlude many of the other faces of the hypercube. These six faces are herein referred to as back faces. Thus, a hypercube comprises 36 faces, of which only thirty are shown in FIG. 2A (and throughout the drawings in this specification). In the terminology used in this specification, a hypercube is the 36 sided four dimensional object illustrated by 2A. Like a three dimensional cube, each face of a hypercube is a two dimensional square (or rectangle).

In the terminology of the present specification, a hypercube has six sides. Each side of a hypercube is a three dimensional cube comprising six faces. Particularly one of the six faces forming the central cube, plus the four faces which emanate from it, plus the corresponding back face. However, as alluded to above, the back faces are not shown in connection with the display method of the present invention. However, as will become clear below, the back face is pertinent with respect to the organizational aspect of the present invention. Therefore, for purposes of display in accordance with the present invention, one may consider a hypercube side to comprise five displayed faces, with the sixth face not being displayed. For instance, the hypercube side shown in FIG. 2A comprises faces A, G, H, I and J. Thus, just like each face of a three dimensional cube is a two dimensional square, each side of a four dimensional hypercube is a three dimensional cube.

As will become clear from the description below, in the organization and display of data in accordance with the present invention, data files, such as Web pages, will correspond to faces of cubes or hypercubes and will be displayed in a position on the computer screen corresponding to a face of a cube or hypercube.

Figure 3:
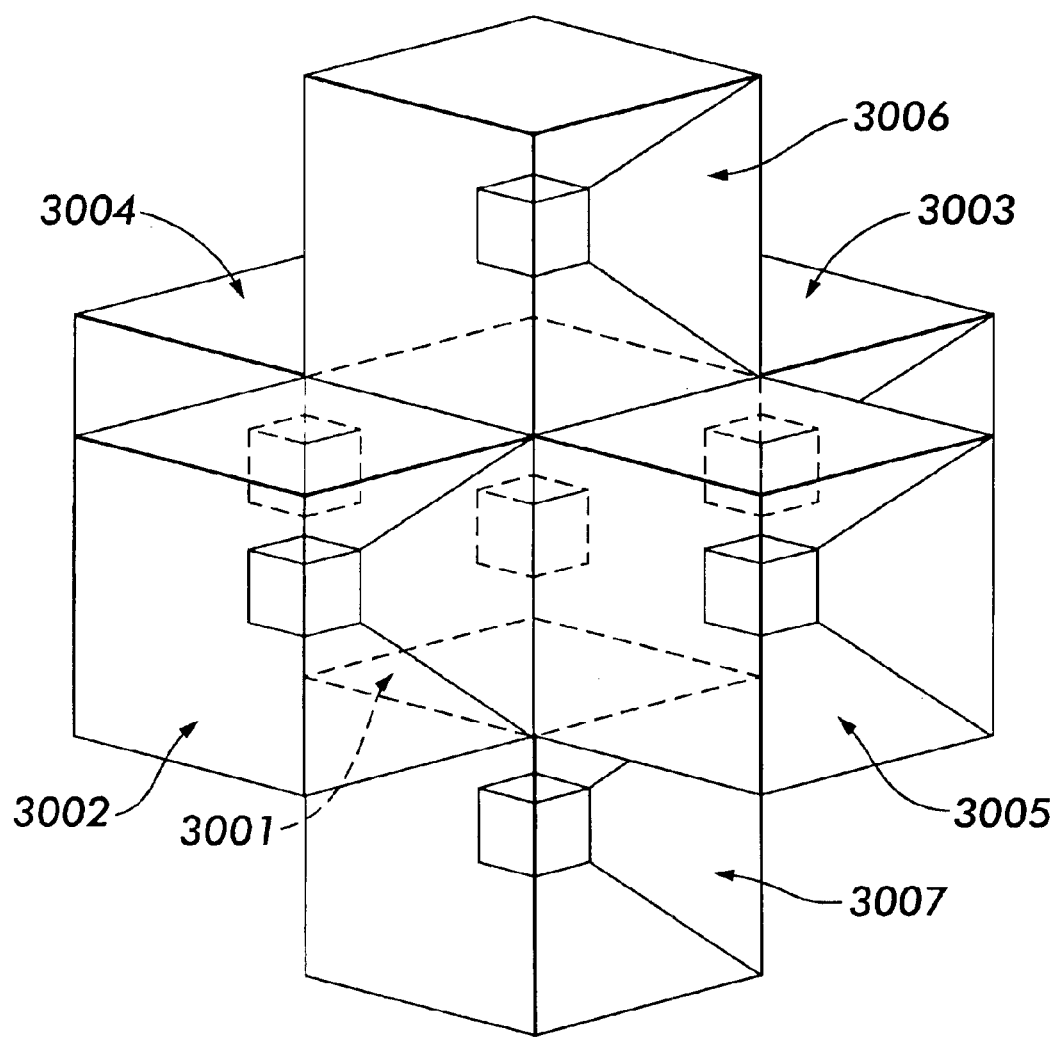
FIG. 3 is a perspective view of seven spatially related hypercubes.

FIG. 3 is a perspective view of seven adjacent hypercubes in three dimensional space. Specifically, a central hypercube 3001 is surrounded by hypercube 3002 to its left, hypercube 3003 to its right, hypercube 3004 to its rear, hypercube 3005 to its front, hypercube 3006 to its top, and hypercube 3007 to its bottom. The space between these hypercubes can be filled with additional hypercubes.

Figure 4:
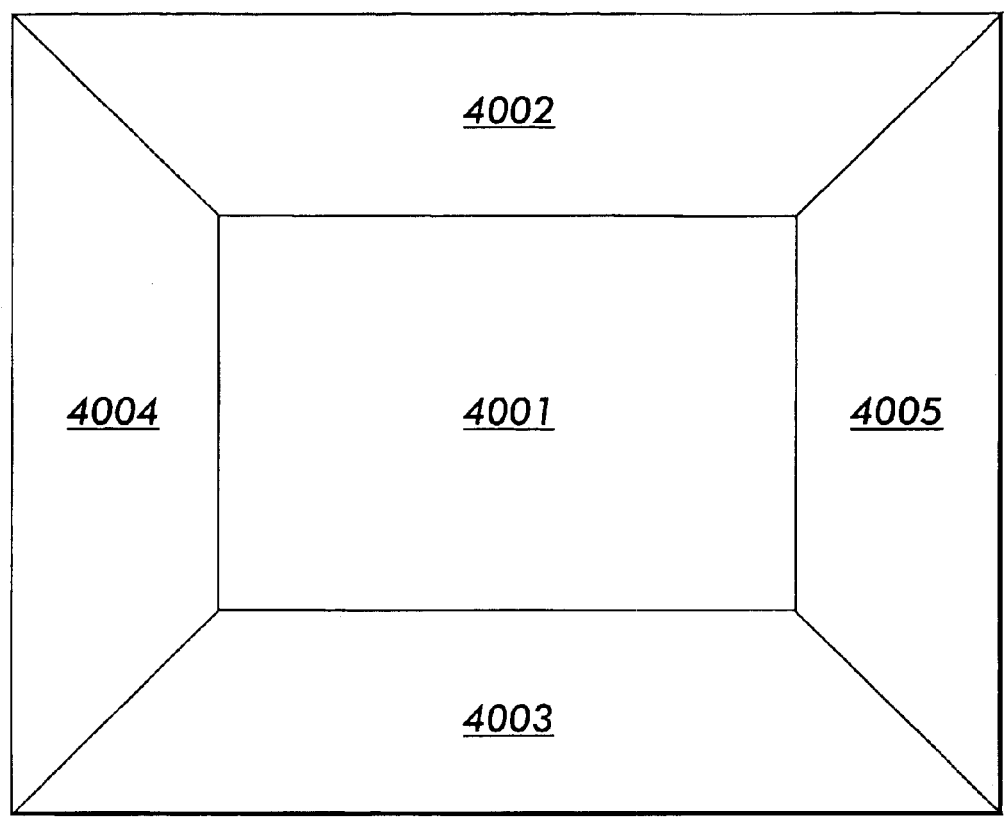
FIG. 4 is a plan view of one side of a hypercube.

A plan view of one side of a hypercube is shown in FIG. 4. It comprises faces 4001, 4002, 4003, 4004 and 4005. Central face 4001 is square and appears square in the plan view, whereas surrounding faces 4002 through 4005 appear generally trapezoidal to maintain perspective, but also are actually square.

Figure 5:
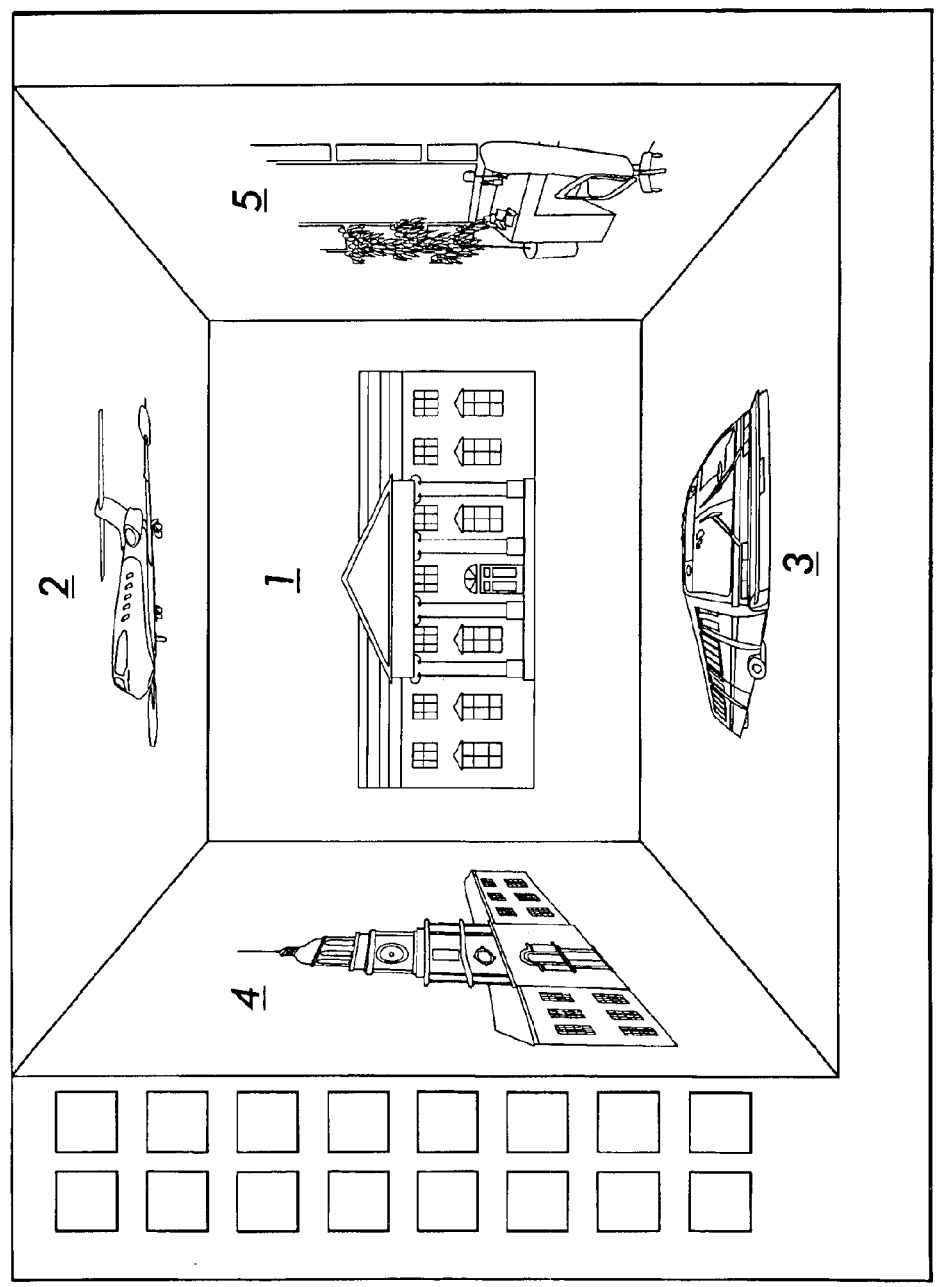
FIG. 5 is a view of a computer screen display in accordance with a first embodiment of the present invention.

This two dimensional representation of one side of a hypercube, excluding the back face, is the basic building block of the display of the present invention. (Recall that a side of a hypercube is simply a three dimensional cube). At a basic level, five related Web pages will be displayed simultaneously on the computer screen as shown in FIG. 5. FIG. 5 is essentially a cube (or one side of a hypercube). However, the aspect ratio of each face is not square, but is modified to correspond to the standard aspect ratio of a computer screen (about 1.3 to 1). In other words, the faces are rectangular, rather than square. Thus, it should be clear that the term hypercube as used herein refers to a four dimensional object having six sides and 36 faces in which all adjoining edges are mutually perpendicular, but is not limited to such objects with square faces and the term cube refers to a three dimensional object having six faces in which all adjoining edges are mutually perpendicular, but is not limited to such objects with square faces.

Let us first consider the display of pages in accordance with the present invention disembodied from the logical organization of the pages to each other. FIG. 5 illustrates the screen that an operator of a Web browser in accordance with the present invention might see. Thus, the operator would see five Web pages simultaneously in faces 1, 2, 3, 4 and 5 on the computer screen with the central Web page appearing essentially normally and the four Web pages filling the four surrounding faces appearing in the polygonal shapes shown in FIG. 5. This presentation gives the illusion of looking upon a three dimensional space, namely the inside of a cube with one face, the back face, removed.

In the terminology used in the present specification, the portion of the computer screen corresponding to each face is herein termed a window. Thus, in the terminology of the present specification, a page is the information content corresponding to a hypercube face. A hypercube face that appears on the computer screen display will appear in one of the windows. As will become clear below, in any particular organization of the pages in accordance with the present invention, a Web page would always correspond to the same hypercube face. However, whether or not that face appears in a window on the screen depends upon the "orientation" (as described below) to which the operator has navigated. It should also be understood that on a subsequent visit to the same web site the pages may be given a different organization. However, for any particular organization, the page will always correspond to the same face as the operator navigates through the pages.

Figure 6:
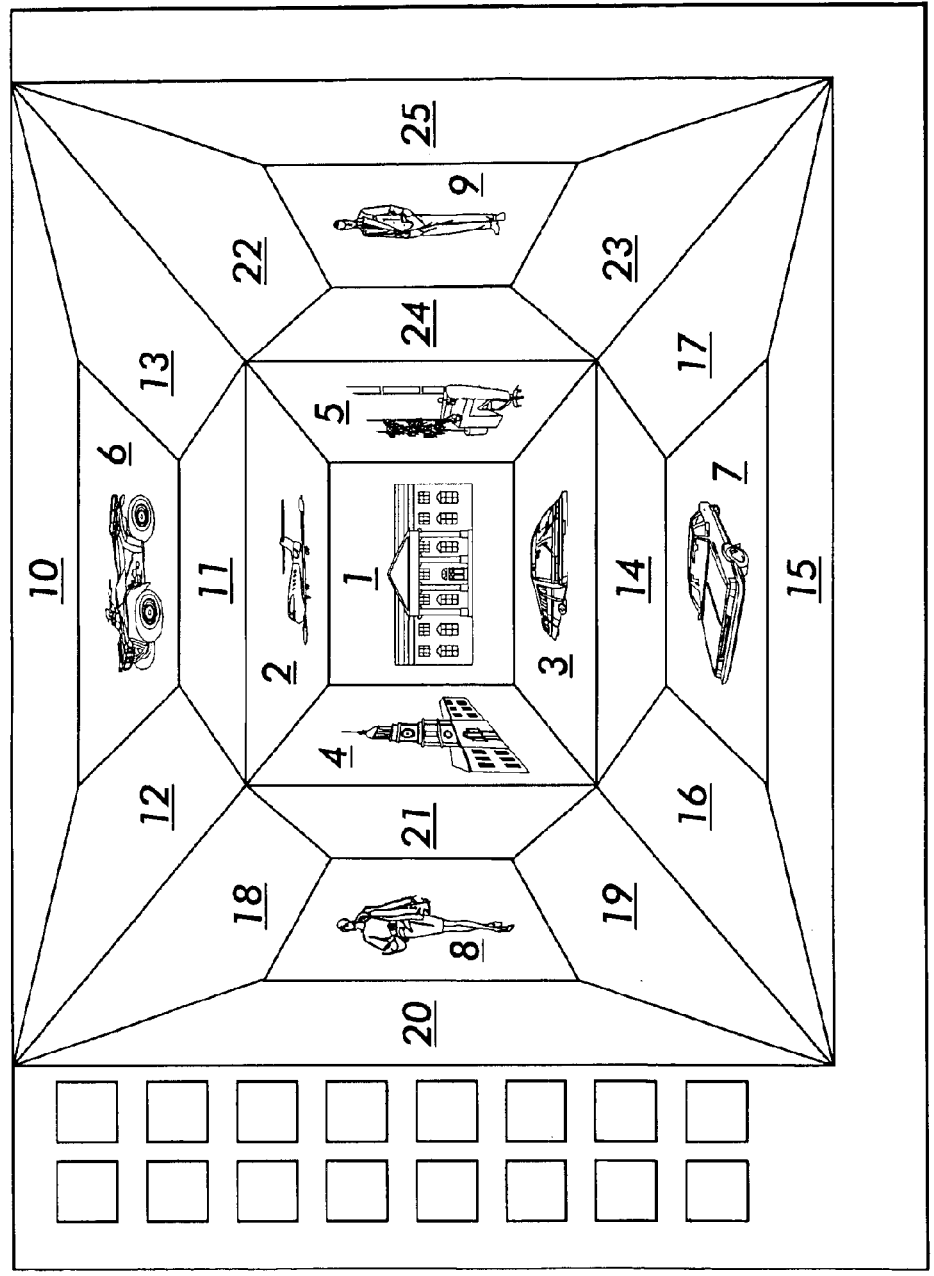
FIG. 6 is a view of a computer screen display in accordance with a second embodiment of the present invention.

In another embodiment, corresponding to the next level of the invention, 25 pages can be displayed simultaneously, as shown in FIG. 6. In this embodiment, another cube or hypercube side extends from each of the non-central faces 2, 3, 4 and 5. Accordingly, in this embodiment, the screen shows five cubes or hypercube sides, each containing five faces, for a total of 25 faces or windows. All of the windows are presented in polygonal shapes to maintain the three dimensional illusion of a collection of cubes or hypercube sides. For instance, in FIG. 6, screens 1, 2, 3, 4 and 5 correspond to the central hypercube, screens 6, 7, 8, 9 and 10 correspond to one side of a hypercube to the right of the central hypercube, windows 11, 12, 13, 14 and 15 correspond to a side of a hypercube above the central hypercube, windows 16, 17, 18, 19 and 20 correspond to a side of a hypercube to the left of the central hypercube and windows 21, 22, 23, 24 and 25 correspond to a side of a hypercube below the central hypercube. As before, each face displays a Web page. (Note that the window reference numerals in the drawings are ordered in the order in which they are filled in accordance with a preferred embodiment of the invention.)

Figure 7:
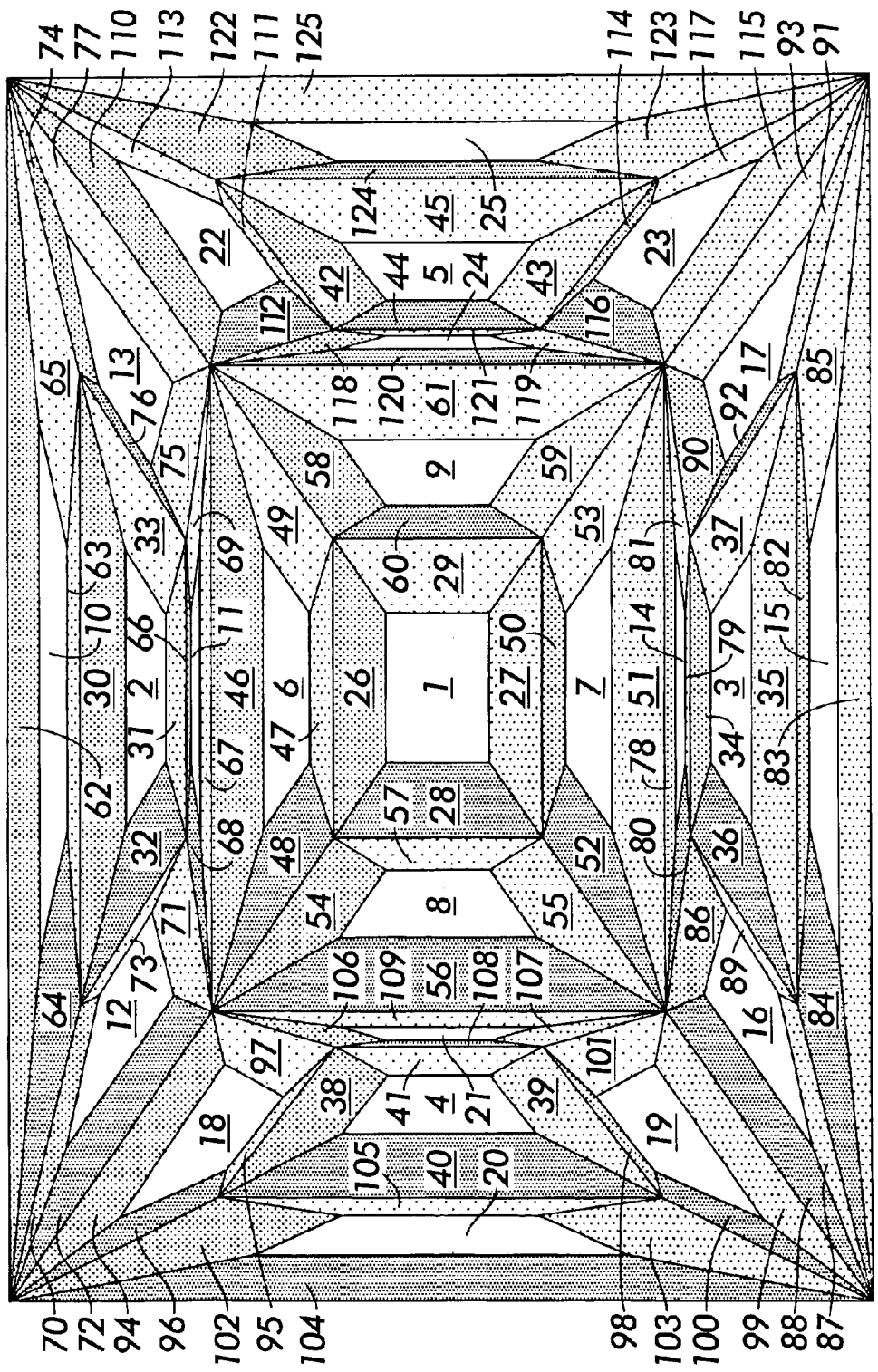
FIG. 7 is a view of a computer screen display in accordance with a third embodiment of the present invention.

Moving out one more level in the spatial analogy results in the display of 125 faces or pages, as shown in FIG. 7. That is, in the next level, a cube or hypercube side corresponding to each of the 20 faces in the secondary level, i.e., faces 6–25, is added. Thus, the 25 faces forming the primary and secondary levels plus 20 more hypercube sides each having five faces (for a total of 100 faces) provides 125 faces or windows.

The windows of the display may be filled in any of several manners. In one embodiment, when the first page is loaded, it is displayed at full screen size. After the next four pages are loaded, the display is switched to that of FIG. 5. After the next 20 pages are loaded, the display is switched to that of FIG. 6 and so on. Alternately, the total number of windows (e.g., 25 in the embodiment of FIG. 6) may be displayed at first without content, with the pages filled into the windows as they are loaded. Even further, these two methods may be combined. For instance, 5 empty windows may be displayed at first and the pages filled into them as they are loaded. After the first 5 pages are loaded, the display is switched to show 25 windows which are then filled as pages 6–25 are loaded.

As can be seen from the description above, the basic manner in which Web pages are displayed in accordance with the present invention does not require any understanding of the theory of hypercubes or four dimensional space. In essence, multiple pages are displayed simultaneously in windows such as illustrated in FIGS. 5, 6 and 7.

Each group of 5 windows is shaped and sized to look like the inside of a cube with one face removed. Preferably, the cubes (i.e., the groups of 5 faces) are arranged relative to each other to appear like a two dimensional representation of a plurality of sides of adjacent hypercubes.

However, the manner in which the pages are displayed is merely one part of the organization of the pages relative to each other. In accordance with the invention, the hypercube analogy is not just for purposes of displaying the data in a particular fashion, but also for organizing the pages relative to each other in a spatial organization different from the linear, tree-like, organization used by standard browsers.

As will be seen from the discussion below, this organization and display method allows an operator to navigate through the world wide Web (or any other displayed computer interface) in a much more efficient and intuitive manner than previous browsers. In operation, an operator may type in a URL corresponding to a Web page of interest. That Web page will load and be displayed in the central window 1 of his computer screen. Additional pages to which this page hyperlinks are loaded in the surrounding windows. The browser allows the operator to view and interact with pages as they are loaded, while, in the background, more pages continue to load.

As a practical example, let us assume an embodiment such as illustrated by FIG. 6 in which a total of 25 windows will be displayed on the screen. If the selected Web page hyperlinks to fewer than 24 other Web pages, then the browser continues to load and display Web pages in the remaining windows to which the secondary Web pages hyperlink. After all 25 windows have been filled with Web pages, in a preferred embodiment, the browser continues to load additional pages following the hyperlink trail as described above. The loading of the pages will stop at some predetermined limit which normally would depend at least partially on the available memory on the computer on which the browser is running. For exemplary purposes, let us assume that pages can continue to load until 125 pages are loaded. Thus, in this exemplary embodiment, 25 related Web pages are displayed as shown in FIG. 6. However, there are an additional 100 related pages stored in memory but which are not displayed on the computer screen. Thus, in accordance with this aspect of the invention, only a proper subset of the web pages (or other computer files) that are organized in the spatial organization are displayed on the screen at any given instant. The term proper subset is a well-known term in mathematics meaning a subset comprising less than the entire set. The browser also maintains a construct in memory that defines the organizational relationship of the pages to each other. That organization is a spatial organization based on at least cubes and preferably hypercubes as discussed above. Accordingly, the spatial relationship can be easily maintained in a four parameter variable table in memory.

In addition to the pages which are stored in memory, the browser may continue to follow the hyperlink trail and store only the URLs of additional pages and denoting the location of those pages in the table. As will be discussed below, following the hyperlink trail is merely one way of selecting pages for loading and displaying. In other embodiments of the invention, the pages that are loaded need not even be linked by hyperlinks, but may be related by other parameters.

The following discussion is of exemplary four dimensional arrangements since the four dimensional organization is conceptually more complex than the three dimensional embodiment. Corresponding three dimensional embodiments, however, should be apparent from the discussion below of four dimensional embodiments.

In accordance with the navigational aspect of the present invention, an operator can interact with a page just as he or she would with any other browser. For instance, the operator can read a page or click on a hyperlink in a page in order to access another page. However, in addition, one may navigate through the four dimensional space represented by the hypercubes by moving the screen pointer over the windows on the screen. An operator can indicate with the screen pointer the window of interest and the browser will rearrange the pages appearing in the windows so that the indicated page appears in the central window 1 and all the other pages reorient to maintain the spatial relationship of the pages to each other as indicated in the table. Thus, for instance, when a particular page is indicated, that page is moved into the center window 1 and the other 24 windows are filled with the pages which surround that page in accordance with the spatial organization stored in the memory. Accordingly, some pages that were being displayed in particular windows move to different windows. Other pages will disappear because, in accordance with the spatial organization, they correspond to hypercube faces which do not correspond to display screen windows in the new orientation. Finally, other pages which did not appear in the previous view now appear in particular windows of the display because, in the new orientation, the hypercube faces to which they correspond now correspond to the windows in the display.

Some or all of the pages that newly appear due to the reorientation may have been in memory already and, therefore, can be displayed essentially immediately. Others may need to be loaded. What pages will be in memory already will depend on how many non-displayed pages are stored in memory and the particular reorientation.

The manner in which one indicates a page to be moved to the center window can take many forms. For instance, in one embodiment, one may move the screen pointer over the page of interest and click. However, preferably, the navigation experience emulates travel through space. This can be accomplished much in the same way as is done in connection with first-person-view-point role playing games such as Doom™ or Quake™. Thus, for instance, they may use the arrow keys, up, down, left, right, to move through the windows. For instance, by clicking on the up key once, the page in window 2 moves into window 1 and all other pages reorient accordingly. In another embodiment, a joystick can be used to control a screen pointer.

In addition to the navigational aspects, an operator may interact with any page on the display screen in the normal fashion. The operator does not need to move that page into the center window 1 in order to interact with it. Accordingly, if the operator has one page in a center screen but recognizes on another page a hyperlink, he may click on the hyperlink. Alternately, if possible, he may simply read the text or view an image on that page that he is interested in without moving the page to the center window.

Figure 8:
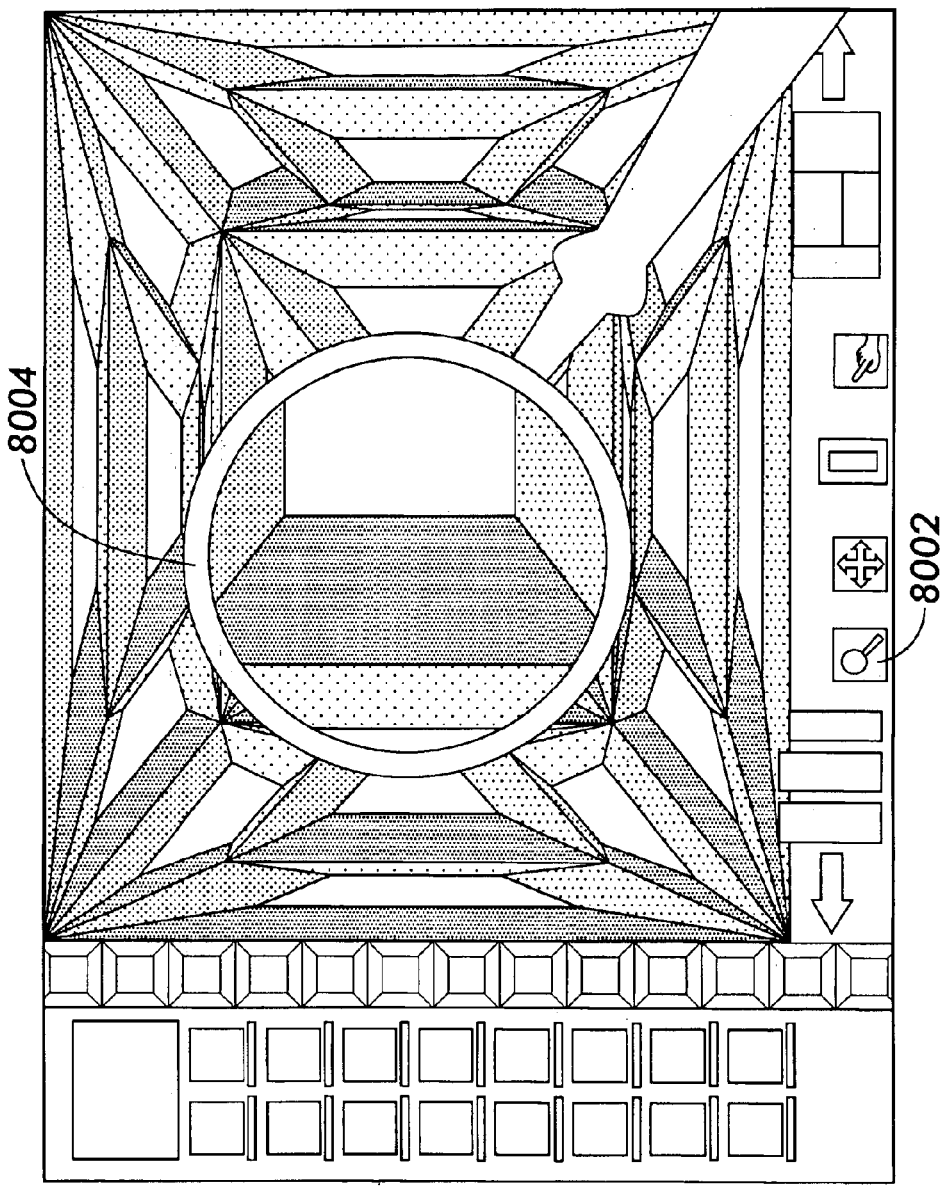
FIG. 8 is a view of a computer screen in which a "magnify" feature in accordance with the present invention is demonstrated.

Since it may be difficult to see data in the windows because of their small size and the fact that all windows other than the central window 1 are distorted in shape, the browser is equipped with a "magnify" tool as illustrated in FIG. 8. By selecting the magnify tool, for instance, by clicking on a magnifying glass icon 8002 on a toolbar, the operator may move his pointer 8004 (which now may appear in the form of a magnifying glass) over the page of interest and that page will be magnified and flattened for convenient viewing without the need for all the faces to reorient in the windows. In one embodiment, the magnifying glass 8004 may be approximately the size of the center window so that the elements of the page can be viewed comfortably. In another embodiment it may be small so that it covers only one page at a time and the operator can click the left mouse button after he or she positions the pointer over the window of interest to enlarge that page (the magnifying glass pointer icon may also be enlarged at this time).

In one preferred embodiment of the invention, when in the magnify mode, clicking on the right mouse button holds the magnified page and allows the operator to use the pointer within that page without having to exit magnify mode.

The invention is particularly adapted and useful in connection with a collection of Web pages that actually correspond to a three dimensional space. For instance, let us consider a Web site that allows an individual to take a virtual tour of a museum. The museum may be a real museum or a fictitious museum. Certain Web pages on this site represent the different rooms in the museum. Each of those pages may contain a series of thumbnail hyperlinks, each hyperlink corresponding to a painting hanging on the wall in that room. Thus, for instance, selecting a particular hyperlink will bring up a page on which a particular painting is shown. That page may contain even further hyperlinks to, for instance, (1) a biography of the artist, (2) a description of the genre to which the painting belongs, (3) a bibliography of the artist's other works, (4) a list of contemporaries of the artist, etc. Those pages may contain even further hyperlinks to other pages. For instance, the page with the list of contemporary artists might contain hyperlinks to biographies about those artists. Other hyperlinks in the pages may move "backwards" to higher levels. For instance, one may back out of a room to a page which shows an entire wing of the museum.

In a situation like this where the Web pages actually correspond to chunks of space, the organizational relationship of the pages to each other should correspond to the spatial relationship of the chunks of space to which the pages correspond. Thus, three of the four dimensions represented in the display can correspond to the three spatial dimensions. The fourth dimension of the organizational structure can correspond to the level of detail, e.g., moving from wing to room to painting to biography, etc.

VRML (Virtual Reality Markup Language) is a computer language which already provides some of the software needed to organize pages or files in correspondence to three dimensional spatial relationship to each other. The present invention, of course, requires a four dimensional relationship and thus requires additional facilities.

The central face of each hypercube side corresponds to looking at the next hypercube behind that hypercube, and particularly, the side of that next hypercube facing the first hypercube. Thus, the windows in the display corresponding to these faces should correspond to the depth spatial dimension. As previously noted, the back face of each hypercube side is not shown on the display and, for purposes of maintaining the spatial analogy, can be considered to be behind the computer operator. Since these faces are not shown, the browser may include a BACK button on a toolbar in order to allow the operator to move in that direction. The operator can also cause the non-displayed back face to be displayed by reorienting to an orientation in which that face would appear in a display window.

The other four faces of each hypercube side correspond to looking at the facing side of the next hypercube to the left, right, top and bottom of the first hypercube, respectively. Thus, with respect to the middle hypercube side in the display (windows 1, 2, 3, 4, and 5 in FIG. 6), all five windows plus the BACK button therefore correspond to moving in the three spatial dimensions. With respect to the four other hypercube sides shown in FIG. 6, the four non-central faces of each of those sides also correspond to spatial movement in the left, right, up and down directions. However, the central faces of those four hypercube sides actually "look into" the hypercubes that are spatially displaced in the fourth spatial dimension from those hypercubes represented in the windows in the display. Thus, the central faces of all but the middle hypercube side actually correspond to the fourth dimension and are used to "move" through the fourth organizational parameter, e.g., level of detail.

By way of example, referring back to FIGS. 3 and 5, hypercube sides A, B, C and D in FIG. 5 correspond to hypercube sides A, B, C and D as marked in FIG. 3. Accordingly, faces 5, 10, 15, 20 and 25 in FIG. 5 look into the spaces between the hypercubes to which hypercube sides A, B, C, D and E correspond in FIG. 5. Accordingly, faces 5, 10, 15, 20 and 25 logically are used to represent the fourth, non-spatial, dimension, e.g., corresponding to increasing (or decreasing) levels of detail. The remaining faces shown in FIG. 5 can be used to navigate in the three dimensions exactly in the manner in which they actually do correspond to the three spatial dimensions.

The organization of Web pages in accordance with the present invention does not need to correspond to spatial dimensions. With respect to most Web sites or any other collection of related files whose relationship to each other does not actually correspond to any spatial relationship, the present invention still can be quite beneficial. Just like the axes on a two dimensional graph (X, Y) or a three dimensional graph (X, Y, Z) can be used to represent any variable relative to one or more other variables, so can the four dimensional relationship of the present invention. Thus, in an e-commerce Web site, for example, in which products are offered for sale, one of the dimensions can correspond to moving in and out in level of detail (just as in the museum example). The other three dimensions can correspond to other criteria. For instance, left and right can correspond to moving among different products made by the same manufacturer, moving up and down can correspond to moving through products in the same price range, and moving in and out of the screen can correspond to moving through products having similar features (e.g., if the products are automobiles, the criteria may be four-door sedans). Accordingly, the pages would be assigned to hypercube faces in accordance with these criteria.

Another intuitive manner of organizing Web pages relative to each other is to cause separate Web sites to correspond to separate hypercubes or hypercube sides if a Web site comprises more than 5 pages, the sixth, seventh, etc. pages can be made to correspond to the faces of the aforementioned smaller hypercubes within the larger hypercube corresponding to the Web site.

As previously noted, the present invention is not limited to use in connection with Web pages but is applicable to any collection of computer files having a displayable component. Thus, another natural application of the present invention is any computer program that is capable of presenting multiple windows for operator interaction with the program. This includes essentially all modern application software, which primarily provide for operator interface through the use of GUIs (Graphical User Interfaces). The various windows that are normally accessed via pull-down menus and the like can correspond to different hypercube faces and windows in accordance with the present invention.

For Web pages or other computer files to be organized according to any particular criteria, whether it is spatial or otherwise, the necessary information for creating such an organization should be available to the browser software. Accordingly, preferably, Web designers would include such information in meta-tags, such as XML meta-tags, embedded within the pages.

A Web page authoring tool can be provided in accordance with the present invention that provides for this particular feature. It would also be desirable to provide a software tool for converting existing Web pages to a form more suitable to the present invention. At its simplest level, this may simply be a software module for adding meta-tags to pages that indicates the organizational relationship of a page to one or more related pages. The browser portion of the software, of course, would be designed to recognize and utilize these meta-tags to organize the pages.

Since, in accordance with the present invention, Web pages that are related to the page shown in the center window are loaded and stored in memory, an operator can navigate through a Web site much more quickly. Particularly, while the operator is viewing one page, the related pages are loading. Accordingly, when the operator navigates to another page, he or she does not need to wait for the page to be loaded. It is already loaded on the computer and merely needs to be moved into a different window (or magnified in accordance with the magnify feature as described above).

It should be apparent, however, that much of the benefit of the present invention is still obtained even if the Web site or collection of pages does not include meta-tags or metadata indicating its organizational relationship to other pages. A browser in accordance with the present invention can be adapted to impose an organization on the pages based on information that is commonly found in a Web page. Particularly, pages can be organized according to the direction of hyperlinking between them. For instance, pages which contain hyperlinks to other pages can simply be assumed to be pages of a more general level of detail than the pages to which they hyperlink.

Alternately, the imposed organization can be a function of the operators' previous habits when navigating through the Web site on previous visits to that Web site. Specifically, the browser can be designed to observe and store information as to the operator's previous navigation through a Web site and that information can be used to define the organization. In this embodiment, the organization of the pages can constantly be updated after each time the operator visits the Web site. Preferably, the browser software provides the operator with a menu to select the manner in which the pages are organized. For instance, the operator may have the option of organizing (1) by most visited pages based on previous habits, (2) as dictated by the relevant meta-tags defining an organizational structure, if any, or (3) by following the hyperlink trail linearly. Even if pages are assigned to hypercube faces on an entirely random basis following the hyperlink trail, much of the benefit of the present invention is still preserved.

In accordance with another aspect of the invention, the operator is provided with the option to specify the number of hypercube sides to be displayed on the screen simultaneously, e.g., 1, 5 or 25 sides.

It should be apparent that the present invention is even better suited to 3-D heads up computer displays where the three dimensional view appears even more real to the operator.

Having thus described a few particular embodiments of the invention, various alterations, modifications, and improvements will readily occur to those skilled in the art. For instance, the four dimensional objects that are the basis of the organization of data in accordance with the present invention need not be hypercubes, but could be other four dimensional objects. While most four dimensional objects other than a hypercube would leave empty spaces between the objects, this does not affect the fundamental utility of the present invention.

Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A method of organizing and displaying data on a display device, said data comprised of a plurality of separate units for display, said method comprising the steps of:
   (1) relating said data units to each other in a spatial organization of at least three dimensions; and
   (2) displaying a simultaneously on said display device a proper subset of said data units in positions relative to each other representative of said spatial organization;
   said spatial organization comprising a virtual volume containing a plurality of at least three-dimensional polyhedrons having faces, wherein each data unit is displayed in a separate one of said faces and wherein said spatial organization comprises a virtual volume containing said data units that is larger than said virtual volume represented in said display of said display device;
   (3) enabling an operator to manipulate said display so as to move one of said data units on said display; and
   (4) responsive to movement by said operator of one of said data units, moving other ones of said plurality of data units on said display so as to maintain said spatial relationship of said plurality of data units;
   wherein step (2) comprises displaying five data units simultaneously in an array comprising a central window, a left window to the left of said central window, a right window to the right of said central window, a top window to the top of said central window, a bottom window to the bottom of said central window, said individual data units, respectively, being displayed in said individual windows.

2. The method of claim 1 wherein step (2) comprises displaying said data units in a two dimensional arrangement visually representative of a space comprising at least three dimensions.

3. The method of claim 2 wherein step (1) comprises generating a table having at least three parameters and storing information in said table indicating the position of said data units relative to each other.

4. The method of claim 2 wherein each of said data units comprises a distinct computer file and wherein, independent of step (1), said computer files contain data by which said computer files are logically related to each other by at least one spatial attribute.

5. The method of claim 4 wherein said spatial attribute is that said data contained in said computer files cause each computer file to correspond logically to a portion of space.

6. The method of claim 5 wherein said spatial attribute comprises at least three attributes, including three spatial coordinates and wherein said portion of space is a portion of three dimensional space.

7. The method of claim 6 further comprising a fourth attribute comprising a level of detail.

8. The method of claim 1 wherein step (1) comprises relating said plurality of said data units in correspondence to faces of a four spatial dimensional object.

9. The method of claim 8 wherein said four spatial dimensional object is a hypercube.

10. The method of claim 8 wherein said central, left, right, top and bottom windows correspond to a side of a hypercube.

11. The method of claim 10 wherein step (2) comprises displaying at least twenty five data units simultaneously in a display comprising five of said arrays.

12. The method of claim 11 wherein said arrays are arranged relative to each other to emulate sides of at least five adjacent hypercubes.

13. The method of claim 8 wherein step (1) comprises generating a table having four parameters and storing information in said table indicating the position of said data units relative to each other.

14. The method of claim 8 wherein each said data unit comprises a distinct computer file and wherein, independent of step (1), said computer files contain data by which said computer files are logically related to each other by four attributes.

15. The method of claim 14 wherein one of said attributes is level of detail.

16. The method of claim 1 wherein said central window is rectangular and said left, right, top and bottom windows are trapezoidal whereby said central, left, right, top and bottom windows emulate the inside of a cube.

17. The method of claim 1 wherein each said data unit comprises a distinct computer file.

18. The method of claim 17 wherein said computer files are portions of computer application programs that correspond to operator interfaces.

19. The method of claim 17 wherein said computer files are web pages.

20. The method of claim 17 wherein said computer files include information defining said spatial organization of said computer files to other computer files.

21. The method of claim 20 wherein said information defining said spatial organization comprises meta-tags.

22. The method of claim 21 further comprising the step of:
   (5) prior to step (1), inserting into said web pages, meta-data defining said spatial organization.

23. The method of claim 17 wherein said display device is a three dimensional display.

24. The method of claim 17 wherein display is a screen of a computer display terminal.

25. A computer implemented method of organizing data and displaying said data on a computer display, said data comprised of a plurality of separate computer files comprising data for display, said method comprising the steps of:

(1) storing in a memory information relating said plurality of computer files to each other in correspondence to faces of a cube of at least three spatial dimensions; and (2) displaying simultaneously on said display a proper subset of said computer files in positions relative to each other that are visually representative of said at least three spatial dimensions;

said spatial organization comprising a virtual volume containing a plurality of faces, wherein each data unit is displayed in a separate one of said faces, and at least one of said faces can be exploded to reveal further computer files spatially organized and displayed on faces representing an at least three dimensional organization;

wherein step (2) comprises displaying five computer files simultaneously in an array comprising a central window, a left window to the left of said central window, a right window to the right of said central window, a top window to the top of said central window, a bottom window to the bottom of said central window, said individual data units, respectively, being displayed in said individual windows.

26. The method of claim 25 wherein step (2) comprises displaying said computer files in a two dimensional arrangement visually representative of a space comprising at least three dimensions.

27. The method of claim 26 wherein step (1) comprises relating said plurality of computer files in correspondence to faces of a four spatial dimensional object.

28. The method of claim 27 wherein step (2) comprises displaying said computer files in a two dimensional arrangement visually representative of said four spatial dimensional object.

29. The method of claim 28 wherein said four spatial dimensional object is a hypercube.

30. The method of claim 25 wherein said central window is rectangular and said left, right, top and bottom windows are trapezoidal, whereby said front, left, right, top and bottom windows emulate the inside of a cube.

31. The method of claim 25 wherein, independent of step (1), said computer files contain data by which they are related to each other by at least one attribute.

32. The method of claim 31 wherein said attribute is a spatial attribute.

33. The method of claim 32 wherein said attribute is that data in each said computer file corresponds to a portion of space.

34. The method of claim 33 wherein said attribute comprises at least three attributes, including three spatial coordinates.

35. The method of claim 34 wherein said attributes comprise at least four attributes, including three spatial coordinates and a level of detail.

36. The method of claim 31 wherein said computer files are web pages.

37. The method of claim 36 further comprising the step of:

(3) prior to step (1), associating with said web pages data defining said relationship.

38. The method of claim 37 wherein said information defining said relationship comprises meta-tags.

39. The method of claim 25 wherein said spatial organization comprises a virtual volume containing said data units that is larger than said virtual volume represented in said display of said display device.

40. A computer implemented method of organizing data and displaying said data on a computer display, said data comprised of a plurality of separate computer files comprising data for display, said method comprising the steps of:

(1) storing in a memory information relating said plurality of computer files to each other in correspondence to faces of a four dimensional hypercube; and (2) displaying simultaneously on said display a proper subset of said computer files in positions relative to each other that are visually representative of said at least three spatial dimensions in a two dimensional arrangement visually representative of a space comprising four spatial dimensions;

said spatial organization comprising a virtual volume containing a plurality of faces, wherein each data unit is displayed in a separate one of said faces, and at least one of said faces can be exploded to reveal further computer files spatially organized and displayed on faces representing an at least three dimensional organization, wherein step (2) comprises displaying five data units simultaneously in an array comprising a central window, a left window to the left of said central window, a right window to the right of said central window, a top window to the top of said central window, a bottom window to the bottom of said central window, said individual data units, respectively, being displayed in said individual windows, said array comprising a side of a hypercube.

41. The method of claim 40 wherein said central window is rectangular and said left, right, top and bottom windows are trapezoidal whereby said central, left, right, top and bottom windows emulate the inside of a cube.

42. The method of claim 41 wherein said central, left, right, top and bottom windows correspond to one side of said hypercube.

43. The method of claim 42 wherein step (2) comprises displaying at least twenty five data units simultaneously in a display comprising five of said arrays.

44. The method of claim 43 wherein said arrays are arranged relative to each other to emulate sides of five adjacent hypercubes.

45. A method of organizing and displaying data on a display device, said data comprised of a plurality of separate units for display, said method comprising the steps of:

(1) relating said data units to each other in a spatial organization of at least three dimensions; and (2) displaying a simultaneously on said display device a proper subset of said data in positions relative to each other representative of said spatial organization;

wherein each of said data units contains within itself information defining its position within said spatial organization wherein step (2) comprises displaying five computer files simultaneously in an array comprising a central window, a left window to the left of said central window, a right window to the right of said central window, a top window to the top of said central window, a bottom window to the bottom of said central window, said individual data units, respectively, being displayed in said individual windows.

46. The method of claim 45 wherein said data units comprise distinct computer files.

47. The method of claim 46 wherein said computer files comprise web pages.

48. The method of claim 47 wherein said information defining said position comprises meta-tags.

49. The method of claim 48 further comprising the step of:
(3) prior to step (1), inserting into said web pages, meta-data defining said spatial organization.

50. The method of claim 45 wherein said spatial organization comprises a virtual volume containing a plurality of at least three-dimensional polyhedrons having faces, wherein each data unit is displayed in a separate one of said faces.

51. The method of claim 45 wherein said spatial organization comprises a virtual volume containing said data units that is larger than said virtual volume represented in said display of said display device.

* * * * *